May 10, 1932.　　　C. H. WHITE　　　1,857,749
PLANTER
Filed July 18, 1927　　　5 Sheets-Sheet 3

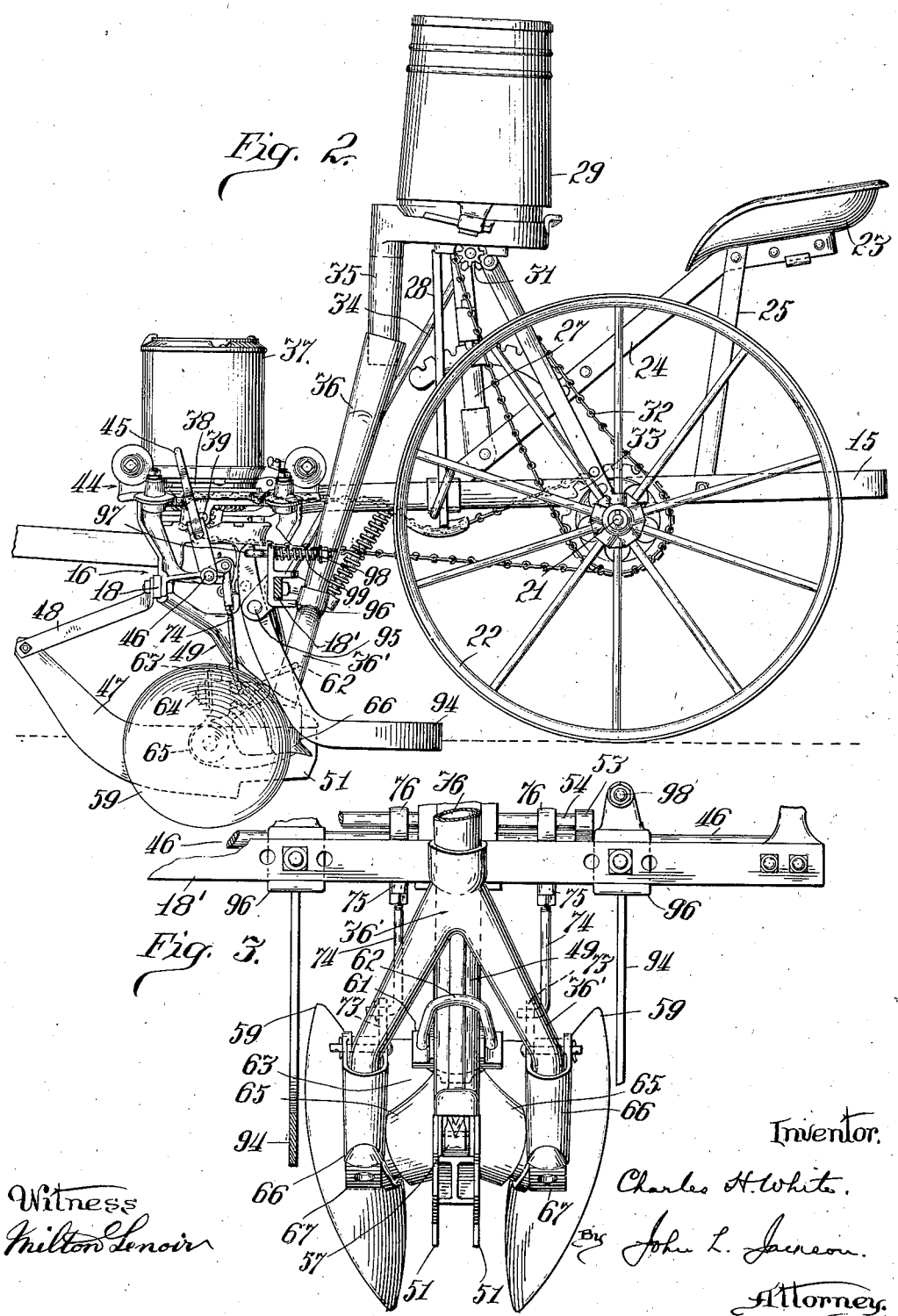

May 10, 1932.  C. H. WHITE  1,857,749
PLANTER
Filed July 18, 1927    5 Sheets-Sheet 4
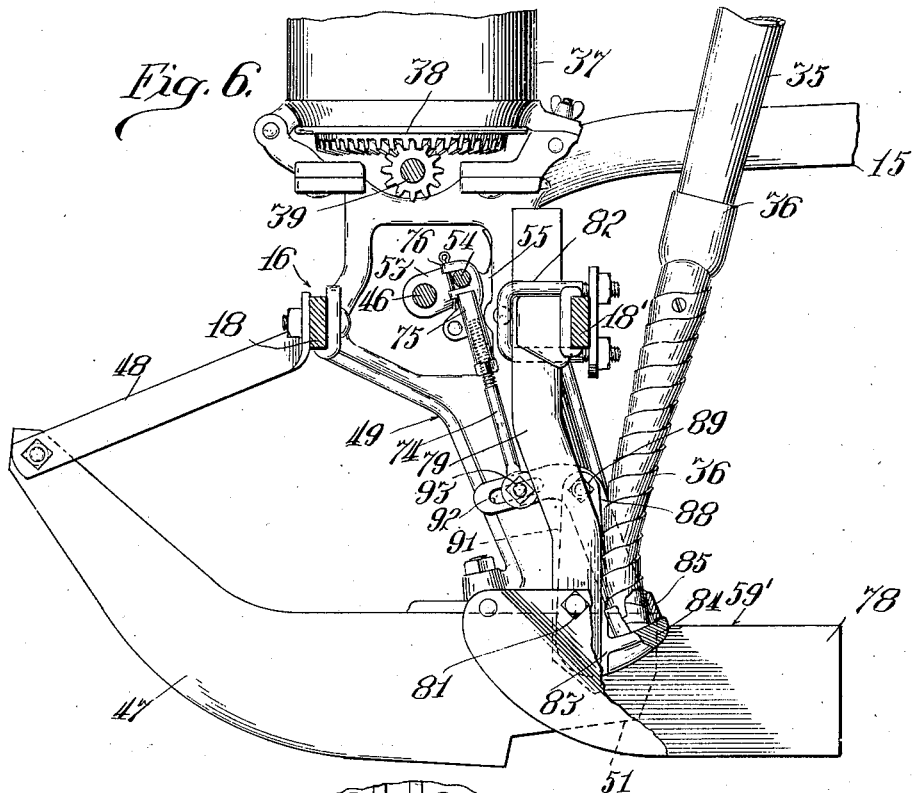
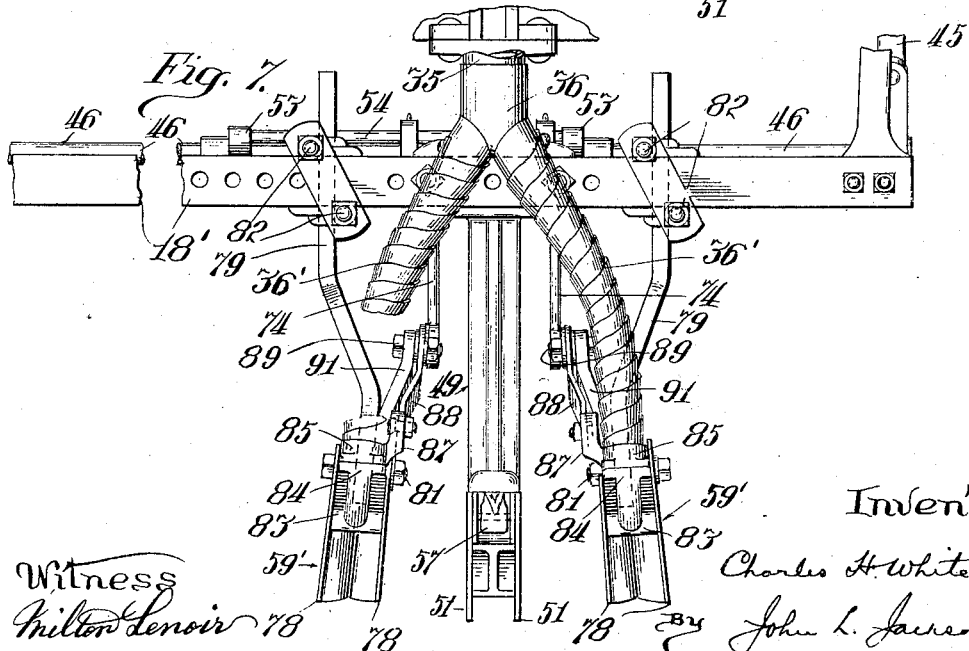

May 10, 1932.    C. H. WHITE    1,857,749
PLANTER
Filed July 18, 1927    5 Sheets-Sheet 5
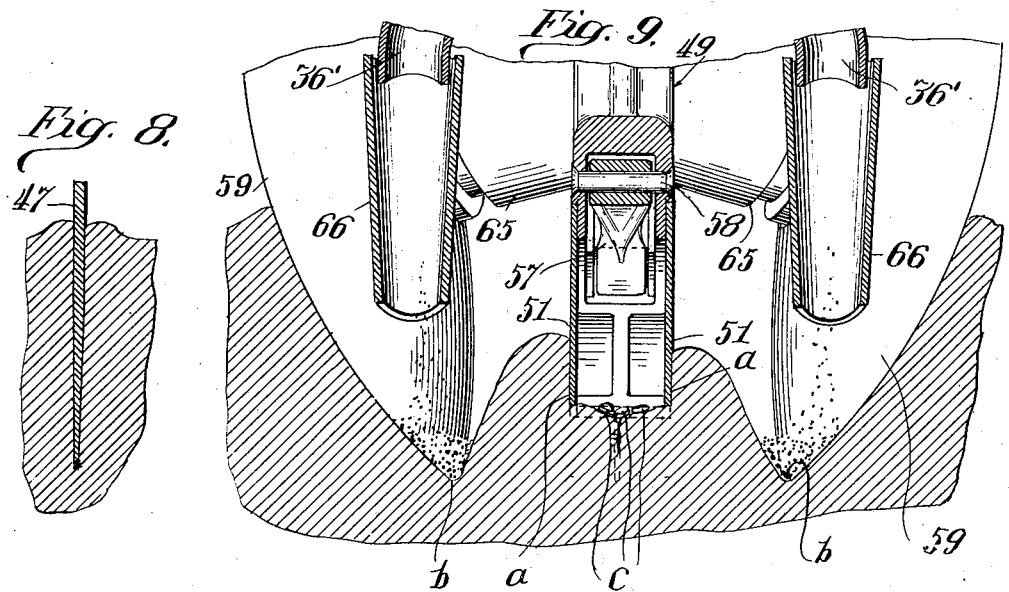
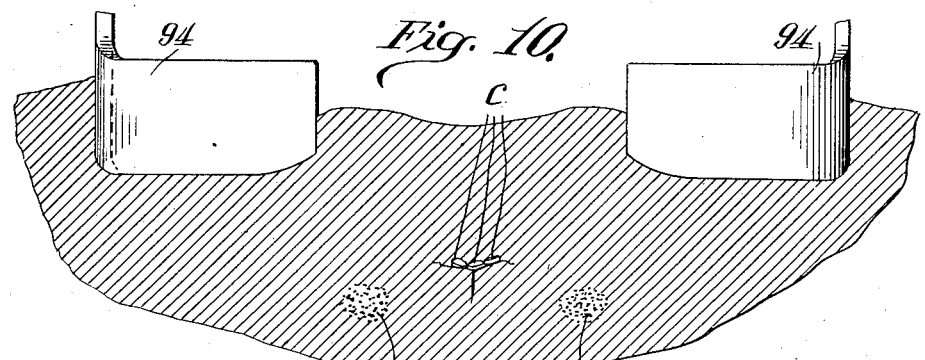
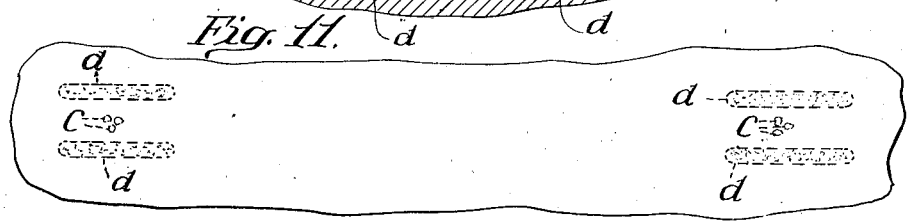
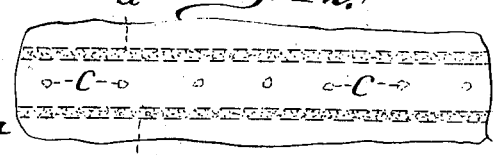
Inventor
Charles H. White.
By John L. Jackson
Attorney
Witness
Milton Lenoir Patented May 10, 1932

1,857,749

UNITED STATES PATENT OFFICE

CHARLES H. WHITE, OF MOLINE, ILLINOIS, ASSIGNOR TO DEERE & COMPANY, OF MOLINE, ILLINOIS, A CORPORATION OF ILLINOIS

PLANTER

Application filed July 18, 1927. Serial No. 206,428.

The present invention relates to planting implements of the type which distribute fertilizer along with the planting operation, as by depositing the fertilizer in a furrow or furrows in the seed bed in proximity to the seed.

In distributing fertilizer in this manner it is desirable that the fertilizer be imbedded in the soil in close proximity to the seed so that the seed and the growing plant will derive the full benefit of the nourishing properties of the fertilizer, but at the same time no appreciable quantity of the fertilizer should be allowed to come into direct contact with the seed, as such has a tendency to detrimentally affect the germination of the seed and the growth of the plant. The latter is commonly referred to as "firing" of the seed and should be avoided in practically all planting operations.

The principal object of the invention is to provide an improved method of planting seed and distributing fertilizer by which the fertilizer is deposited in the seed bed in such proximity to the seed, and to the plant and roots sprouting therefrom, that the seed and plant will derive the full benefit of the fertilizer, but without the possibility of the seed being fired by the fertilizer. More specifically, this distribution consists in depositing the fertilizer in two separate furrows which are opened on each side of the seed furrow, so that quantities of the fertilizer are distributed laterally to each side of the seed.

A further object of the invention is to provide improved apparatus for carrying out this method, and characterized principally by an improved arrangement of furrow openers for forming the two fertilizer furrows on opposite sides of the seed furrow.

Another object of the invention is to provide an improved construction of valve mechanism which has cooperative association with the fertilizer distributing means for controlling the depositing of the fertilizer. Such valve mechanism is adapted to be operatively connected with the check-row valve mechanism of the planter so that the fertilizer can be deposited in hills along with the hill dropping of the seed, as in check-row planting. The valve mechanism of the fertilizer distributing apparatus can also be held in an inoperative position so that the fertilizer will be deposited with a continuous feed, such being frequently desirable, as when drilling the seed.

Other objects and advantages of the invention will be apparent from the following description of a preferred embodiment thereof.

In the drawings illustrating such embodiment:

Figure 2 is a side elevational view of the same.

Figure 3 is a fragmentary rear view illustrating the central furrow opener for opening the seed furrow, and the two laterally disposed furrow openers for opening the fertilizer furrows.

Figure 6 is a view similar to Figure 4, illustrating a modified construction.

Figure 7 is a rear elevational view thereof.

Figure 8 is a vertical sectional view through the front portion of the runner which opens the seed furrow.

Figure 9 is a vertical sectional view showing the operation of depositing the fertilizer in the two furrows or trenches formed laterally of the seed furrow.

Figure 10 is a fragmentary view, taken in the rear of Figure 9, and illustrating the next succeeding step of covering the seed furrow and the fertilizer furrows by covering blades.

Figure 11 is a diagrammatic view illustrating the approximate distribution of the fertilizer with respect to the seed when both are deposited in their respective furrows under check-row operation; and Figure 12 is a similar view showing the approximate distribution of the fertilizer with respect to the seed when both are deposited in their furrows in a drilling operation.

Figure 1:
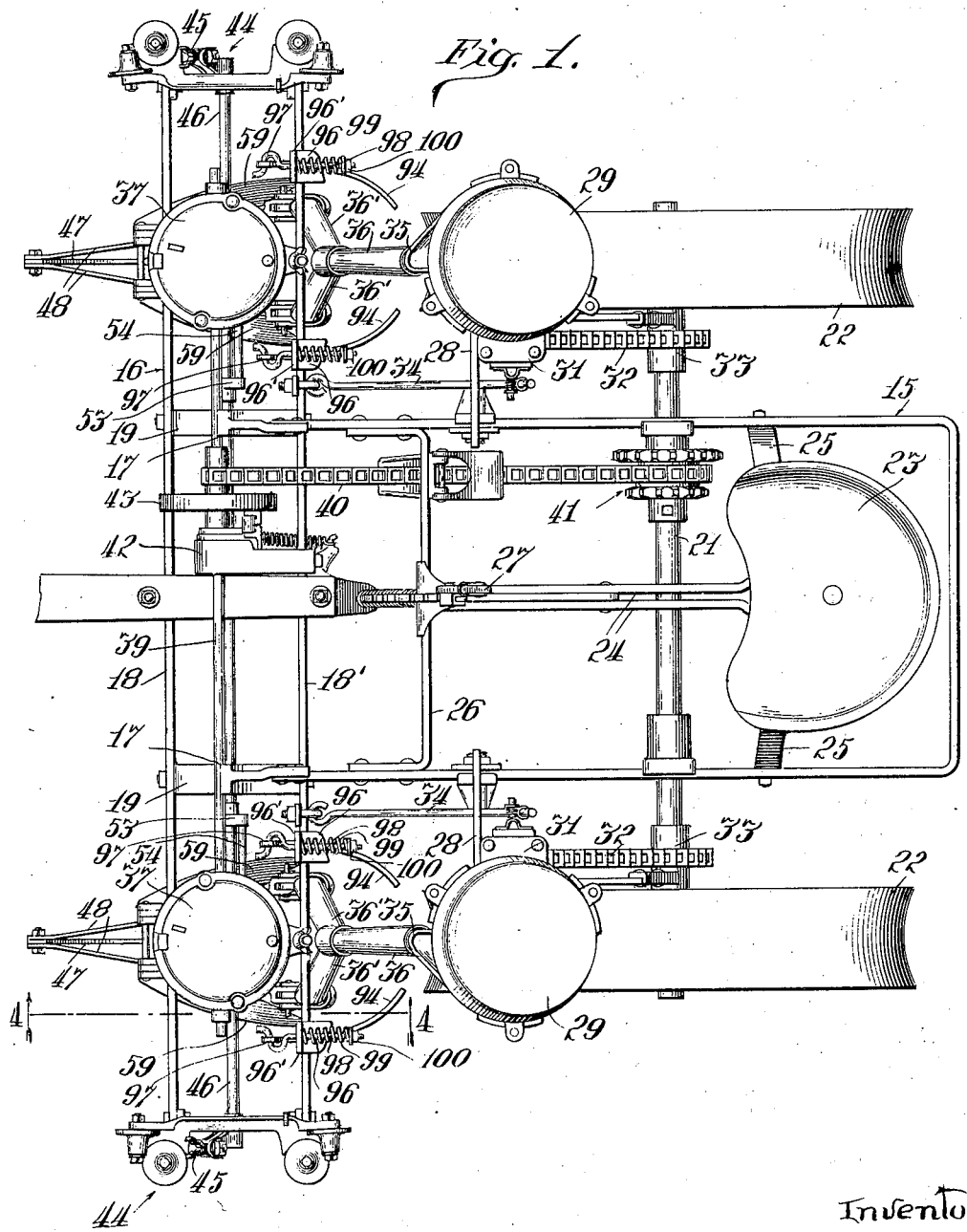
Figure 1 is a plan view of the implement.

While the aforementioned object of depositing the fertilizer in separate furrows spaced laterally from the seed furrow has general application to various types of planters, the feature of also controlling the depositing of the fertilizer by check-row mechanism has particular application to planting implements designed either for check-row planting or for drilling, and accordingly I have disclosed my invention as embodied in such type of implement. Figures 1 and 2 illustrate a typical two-row planter of this type, the same being commonly referred to as a corn planter, although they are also extensively used for the planting of beans, peas, peanuts, etc. In describing the implement I shall only make brief reference to those elements which are old and well known. The implement comprises the usual back frame 15 and front frame 16, which are pivotally connected together at 17. The front frame comprises two spaced parallel bars 18—18' to which cross braces 19 are secured, the two frames being pivoted together at these cross braces. Secured to the back frame 15 is the usual axle 21 on which the two traction wheels 22 are journaled, the latter being usually arranged for shiftable adjustment inwardly and outwardly on the axle. The operator's seat 23 is supported on the back frame 15, being secured to front and rear pairs of supporting bars 24 and 25, the front pair of bars 24 being secured at their lower ends to a cross bar 26, which reinforces the back frame. The usual tilting or adjusting lever 27 for raising and lowering the furrow openers is shown as being pivoted to the front bars 24.

Rising from the sides of the back frame are two brackets 28 which support the two fertilizer hoppers 29, each of these hoppers supplying fertilizer to one of the planting rows. Associated with each of said hoppers is any conventional feeding mechanism for causing a substantially uniform feed of the fertilizer from the hopper down into the boots which discharge the fertilizer into the lateral furrows. As exemplary of such feeding mechanism, a revolving hopper bottom and a stirring arm may be employed, the mounting and operation of the same being well known. The feeding mechanism of each hopper is indicated generally at 31, and is driven by a chain 32, which has suitable operative connection therewith. Each chain passes over an individual sprocket wheel 33 driven by the adjacent traction wheel 22, and any suitable clutch mechanism may be provided for manually starting and stopping the drive of the feed mechanism 31. Automatic means may also be provided for the purpose of interrupting the feed of fertilizer when the furrow openers are raised clear of the ground, the links 34, which are operatively connected between the front frame 16 and the fertilizer feed mechanism, being representative of such automatic control means. The fertilizer is discharged from the feed mechanism 31 into a spout or tube 35 which conveys the same down into a divided duct or conduit 36. The two branches thereof 36'—36' (Fig. 3) distribute the fertilizer laterally to boot or valve members through which the fertilizer is deposited into the lateral furrows, as I shall presently describe.

Figure 4:
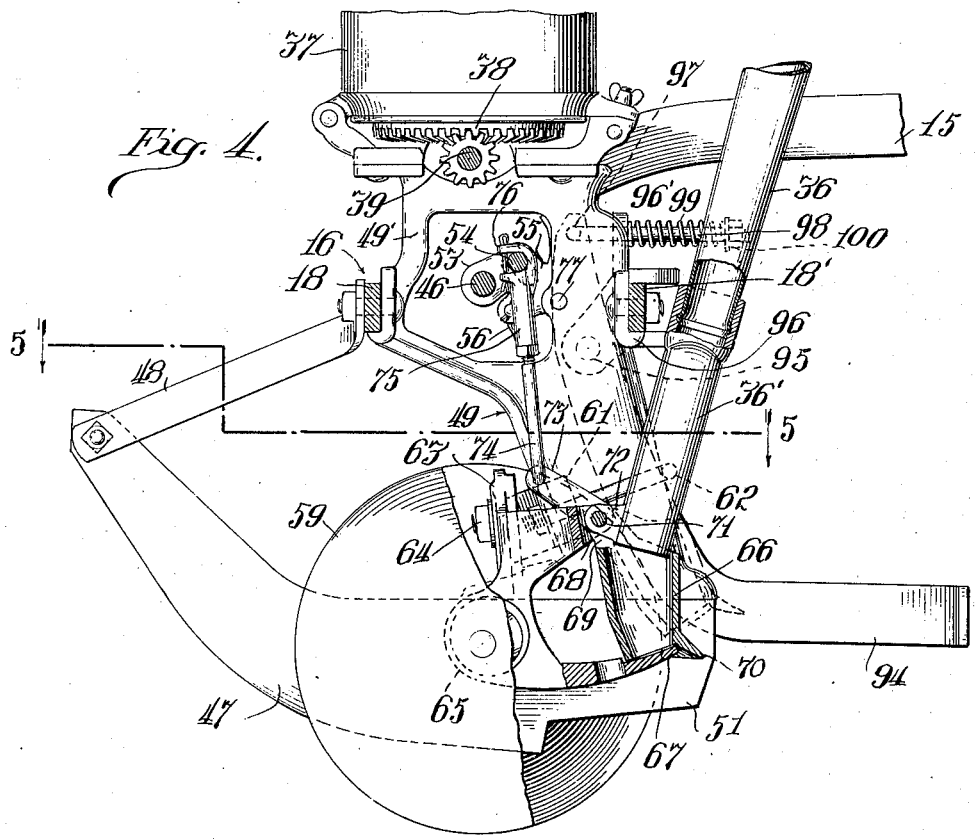
Figure 4 is a fragmentary sectional view taken on the plane of the line 4—4 of Figure 1 and illustrating this grouping of the furrow openers.

Mounted on the front frame 16 are two seed hoppers 37, with which are associated suitable seed feeding or delivering mechanisms, represented by the rotating seed plate 38 shown in Figure 4. These seed separating and feeding mechanisms may be of any preferred type, and require no detailed description since in and of themselves they constitute no part of the present invention. The two delivering or feeding mechanisms 38 of both seed hoppers are driven by a cross shaft 39 which has bearing support on the front frame 16, and which is driven by a sprocket chain 40 extending back to the axle 21. Here the chain is adapted to pass selectively over any one of a series of sprockets 41 of different diameters, whereby the rate of travel of the chain can be adjusted. The drive of the chain 40 is transmitted to the shaft 39 through a variable speed unit indicated in its entirety at 42 (Figure 1), the latter being of any conventional type for securing a variable drop of the seed in order that different numbers of the seeds or kernels can be planted in each hill, as desired. Any suitable clutch mechanism 43 may be provided for throwing the seed delivering mechanisms into and out of operation.

Also mounted on the front frame 16 at the outer ends thereof are conventional check-row mechanisms indicated generally at 44, each of these mechanisms comprising an oscillatory fork or lever 45 adapted to be engaged by the buttons or stop members on the check-wire. The guiding of the check-wire and the general construction of the check heads is old and well known, and need not be described in detail. Each fork or lever 45 is usually mounted on a rock shaft 46 which is pivotally supported on the front frame 16, and has operative connection with the clutch mechanism 43 and also with suitable valve mechanism which controls the hill dropping of the seed.

The two seed furrows may be opened by any suitable furrow openers, such as discs, runners or the like, but in the preferred construction I employ furrow openers of the runner type, such as are indicated at 47. The upwardly curved front end of each runner is secured to the front frame by bracing links 48, and the rear end of the runner is secured to a runner shank 49 which is also bolted to the front frame between the side bars 18—

18'. The upper portion of each runner shank is constructed in the form of a frame 49', on which is mounted the seed hopper 37. The shaft 46 usually extends through this open frame. The front part of each runner is formed with a relatively thin cutting edge (Figure 8), and from this front portion the runner tapers outwardly and rearwardly to form a seed trench or furrow of the desired width. The two side walls 51 shown in Figure 9 represent the separated side walls of the runner adjacent to the rear end thereof. The seed is delivered from each hopper 37, through the feeding mechanism 38, into a passage which extends down through the runner shank 49 and which discharges into the seed furrow between the side walls 51—51. In check-row planting the dropping of the seeds or kernels through the runner shank is controlled by a suitable arrangement of upper and lower valves, which are operatively connected to the rock shaft 46. These valves are not shown, but their general construction and operation is well known, reference being had to my copending application Serial No. 206,429, filed July 18, 1927, for a detailed illustration of the same. It will suffice to say that these valves arrest the fall of the seeds delivered by the feeding mechanism 38 so that an accumulation of two, three or four seeds is dropped into the furrow in a hill with each actuation of the lever 45 by the check-wire. The rock shaft 46 toward each of its ends has crank arms 53 mounted thereon, between each pair of which extends a crank pin 54. The latter engages in a slotted yoke 55 extending from the upper valve unit, and the motion of this valve unit is transmitted to the lower valve unit through a link or rod 56. The lower valve unit is indicated at 57 in Figure 9, the same being pivoted in the lower end of the runner on the transverse pin 58. A foot lever or any other suitable control member is usually provided for the purpose of holding the upper and lower valves in their open positions, at which time the dropping of the seeds or kernels into the furrow is controlled entirely by the feeding mechanism 38, corresponding to the drilling of the seed.

Figure 5:
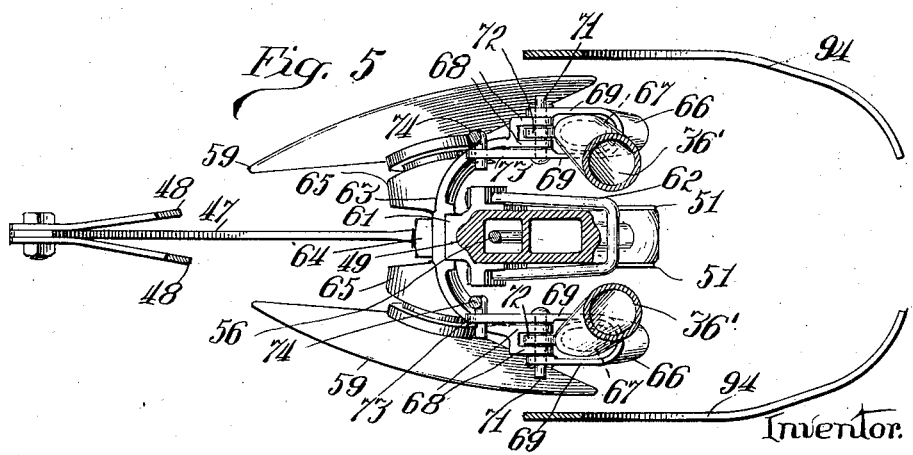
Figure 5 is a horizontal sectional view taken on the plane of the line 5—5 of Figure 4.

I shall only describe the lateral furrow openers and the fertilizer dump valve mechanism in connection with one of the runners 47, as this same mechanism is duplicated at the other runner. I shall also describe the fertilizer distributing apparatus in its preferred form of an attachment adapted for ready mounting on or dismounting from the implement, but it will be obvious that the fertilizer distributing mechanism can be constructed in its entirety as a unitary part of the implement. Mounted on each side of the runner 47 are furrow openers 59 which cut two fertilizer furrows or trenches b on each side of the seed furrow a (see Figure 9). These laterally disposed furrow openers may be of the disc type, as shown in Figures 4 and 5, or they may be of the runner type as shown in Figures 6 and 7. I shall first describe the disc type shown in Figures 4 and 5. Secured to the front side of the runner shank 49 is a mounting block 61 (Figure 5) which is detachably held in place by a U-bolt 62 which embraces the runner shank and which has its threaded ends passing through holes in the block for receiving nuts over said threaded ends on the front side of the block. A curved bracket or yoke 63 extends transversely of the runner shank with its central portion arched over the runner 47, the bracket being secured to the mounting block 61 by a bolt 64. Extending forwardly and downwardly from the opposite sides of the bracket 63 are bearing bosses 65, on which the discs 59 are rotatably supported. The discs are preferably set at an angle to throw the soil turned up out of the furrows b towards the outer sides of the furrows. The discs may be set to run at any desired furrow opening depth by loosening the U-bolt 62 and sliding the block 61 and bracket 63 upwardly or downwardly along the runner shank 49.

The fertilizer is conveyed down through the laterally diverging branches 36' of the divided conduit 36 and is thence discharged into boots or valve members 66 which are disposed on the inner sides of the discs, approximately above the bottoms of the furrows b. Referring to Figure 4, each of such valve members is in the form of a receptacle open at top and bottom and having its open lower end normally disposed above a plate member 67 extending rearwardly from the lower part of the yoke shaped bracket 63. The boot or receptacle member 66 and the closure member 67 constitute the two elements of a dumping valve which controls the depositing of the fertilizer, the closure member 67 being stationary and normally closing the lower end of the receptacle member, and the latter being mounted for swinging movement into and out of cooperative registry with the closure member. Referring to Figure 5, it will be noted that each arm of the yoke shaped bracket 63 is bifurcated at its rear end to form the two spaced arms 68. Each valve member 66 is provided with laterally spaced pivot ears 69 which project upwardly therefrom and engage over the outer sides of the arms 68. A pivot pin 71 passes through the arms and pivot ears, and pivotally supports the valve member for fore and aft swinging movement. A lug or ear 72 also projects forwardly from each branch 36' of the branch conduit and extends between the arms 68, where the pivot pin 71 passes through such lug or ear 72 for holding the lower end of the branch conduit in communication with the upper end of the valve member 66. The branch conduit 36 is preferably composed of rubber and has a comparatively loose fit with the upper end of the valve member 66 so as not to restrict the movement of the latter, it being noted that the valve member forms in effect a movable end for the conduit. The upper surface of the closure member is curved on an arc concentric with the swinging movement of the valve member, and the latter has a lip extension 70 adapted to engage the end of the closure member. The flexibility of the rubber conduit 36 also accommodates the depth adjustments of the discs along the runner shank. Extending forwardly from the inner pivot ear 69 is an arm 73 which has a pivotal connection at its outer end with a link 74. The upper portion of such link comprises a sleeve 75 which is forked to engage over the crank pin 54 which actuates the seed valves, or over a separate crank pin also having crank arm mounting on the shaft 46. The forked portion 76 of the sleeve has readily attachable and detachable connection with the crank pin, as by the provision of a cotter pin or the like extending between the arms of the fork on the front side of the crank pin. The sleeve 75 is internally threaded for receiving the threaded upper end of the lower portion of the link 74 whereby the effective length of the link can be adjusted for controlling the normal position and range of movement of the boot 66. Such adjustability of the length of the link also accommodates the different depth settings of the discs along the runner shank 49.

In the operation of such embodiment, the fertilizer which is fed down through the branch conduit 36 accumulates on the closure member 67 between successive actuations of the valve member 66. When a button or stop on the check-wire strikes the check-row fork 45 the shaft 46 is oscillated, causing operation of the upper and lower seed valves to drop the hill of seeds into the center furrow. Simultaneously with the actuation of such seed valves the link 74 is thrust downwardly, and the valve member 66 is swung rearwardly off of the end of the closure member 67, thus wiping the accumulation of fertilizer off of the closure member and dropping the same from the end of the valve boot down into the fertilizer furrow b directly in rear of the adjacent disc 59. With the restoration of the seed valves to normal position, such being usually performed by suitable spring mechanism, the valve member 66 is also returned to its normal position for receiving another accumulation of fertilizer preparatory to the next succeeding operation of the check-row mechanism. When the implement is to be used for drilling, the seed valves are locked in their open positions, and at such time the boot member 66 is correspondingly held in its open position, i. e., swung rearwardly with its lower end out of registry with the plate member 67, so that the fertilizer is deposited continuously through the boot member. It will be understood that by disconnecting the upper end of the link 74 from the crank pin 54, or by disconnecting the lower end of such link from the arm 73, the seed valves may be made to operate for securing a check-row planting of the seed while the fertilizer valve member 67 is held continuously open for depositing the fertilizer continuously in the fertilizer furrows b. For holding the boot member 66 in its open position at such time, the forked upper end 76 of the link 74 may be engaged over a pin 77 projecting laterally from the runner shank.

Referring now to the modified construction shown in Figures 6 and 7, each of the lateral furrow openers 59' in such construction consists of runners made up of two plates 78—78. The curved forward edges of such plates are secured together to form a relatively sharp edge for cutting the soil, and the rear portions of the plates are separated from each other to form a fertilizer-receiving furrow of the desired width. Each of such lateral furrow openers is secured to a standard or supporting arm 79 which supports the furrow opener on the front frame 16. The lower end of the arm 79 extends between the spaced plates 78 and is rigidly secured thereto by a bolt 81. The upper end of the supporting arm 79 is adjustably clamped to the front of the frame bar 18' by a U-shaped clamping bolt 82 which embraces the supporting arm and frame bar. Such mounting of the supporting arm permits the vertical adjustment of the furrow opener 59' for obtaining any desired depth of the fertilizer furrow b. Rigidly secured between the side plates 78 of each furrow opener is a block 83 from which extends a curved arm or plate member 84. The latter constitutes a closure member for a swinging valve 85, similarly to the valve construction in the preceding embodiment. The valve member 85 consists of a ring or receptacle serving as a movable lower end for the branch extension 36' of the conduit 36. In the present embodiment each branch extension 36' is preferably constructed in the form of a spiraled metal conduit which can swing fore and aft with the swinging movement of the valve member 85, and which can also expand or contract with a telescopic movement for accommodating different depth adjustments of the fertilizer runners 59'. Each valve member 85 has a lug 87 (Figure 7) projecting upwardly therefrom, and to this lug is rigidly bolted the lower arm of a bell crank lever 88. Such lever is pivoted at 89 to a supporting arm 91 which extends upwardly from the runner 59'. The forwardly extending arm of the lever has a longitudinal slot 92 therein, in which is clamped a pivot bolt 93. The pivot bolt is shiftable to any desired position along the length of the slot 92 and can be rigidly clamped in such desired position, the adjustability of the bolt serving to vary the effective length of the lever arm. Pivotally connected to the inner end of the pivot bolt is a link 74 which is substantially similar to the link 74 previously described. The upper end of such link has operative connection with the crank pin 54, or with any individual crank pin carried by the rock shaft 46, as previously described.

The operation of this embodiment is generally similar to the operation of the embodiment shown in Figures 4 and 5. The runners 59' open secondary furrows $b$ spaced laterally from the seed furrow $a$. When the fertilizer is to be deposited intermittently along with the check-row planting of the seed, the valve member 85 is oscillated out of registry with the closure member 84 with each actuation of the seed valve mechanism, thus dropping the collected quantity of fertilizer in the branch conduit 36 down into the lateral furrow $b$. This operation, of course, applies to both of the secondary runners and their associated valve mechanisms. It will also be understood that when the seed valve mechanism is locked in its open position the fertilizer valve members 85 will be held in their open position; also that by disconnecting the links 74 the fertilizer valve members 85 may be held in their open positions while the seed valve mechanism remains operative for securing a check-row planting of the seed.

In each of the embodiments shown in Figures 4 and 6, the operation of covering the three furrows $a$ and $b—b$ after the depositing of the seed and fertilizer therein, is performed by a pair of covering blades 94. As shown in Figures 5 and 10, the rear ends of these blades are curved inwardly to scrape or deflect the ridges of soil which have been turned up along the sides of the three furrows back into said furrows in a covering operation. Referring to Figure 4, it will be noted that the front portion of each blade extends upwardly between the bars 18—18' of the front frame, where the blade has pivotal connection at 95 to a bracket 96 secured to the rear frame bar 18'. The upper end of each blade above the pivot 95 has pivotal attachment at 97 to a bolt 98 which extends rearwardly through an opening in a stationary arm 96' extending up from the bracket 96. A compression spring 99 is confined on this bolt between the arm 96' and a nut 100 screwing over the rear end of the bolt. It will be observed that the pressure of the spring 99 is normally effective to force the lower end of the blade down into yielding engagement with the soil, whereby the blade is held in effective engagement with the soil for deflecting the same into the furrows, but is permitted to swing upwardly upon striking clods or stones in the soil.

In the operation of the implement the intremediate runner 47 opens a central furrow $a$ in the soil, as has been previously described. Into this furrow the seeds $c$ are dropped from the seed feeding apparatus represented by the hopper 36 and the feeding plate 38. Depending upon whether the seed valve mechanism 55—57 is set for check-row operation or is held in open position, the seeds $c$ will be planted in hills or will be planted singly. Concurrently with the opening of the seed furrow $a$ the two lateral furrow openers 59—59' will also open the secondary or fertilizer furrows $b$. Into such secondary furrows the fertilizer will be deposited from the fertilizer feeding apparatus represented by the hopper 29, feeding mechanism 31 and conduit means 35—36. The fertilizer will be deposited intermittently in said furrows with the check-row planting of the seed, or will be deposited continuously with the drilling of the seed, depending upon whether the fertilizer valve means 66—85 is operatively connected for intermittent movement with the seed valve mechanism 55—57, or is held continuously in its open position. The covering blades 94 in following along behind the three furrow openers, scrape the adjacent soil, including the ridges turned up along the sides of the furrows, back into the three furrows to cover the seeds and to cover the deposits of fertilizer, as shown in Figure 10. The traction wheels 22 also assist in this covering operation.

Figure 11 illustrates approximately the distribution of the fertilizer with respect to the seed when both are deposited in their respective furrows under check-row operation. It will be observed that each deposit of fertilizer is located substantially directly opposite its individual hill of seeds, so that the fertilizer will be in close proximity to the seeds for transferring its nutritive properties thereto. Figure 12 illustrates the distribution of the fertilizer with respect to the seed when both are deposited in their respective furrows in a drilling operation, i. e., when the seed valve mechanism 55—57 and the fertilizer valve means 66—85 are held in their open inoperative positions. By disconnecting the fertilizer valves from the seed valve mechanism, it is also possible to drop the seed in hills, as shown in Figure 11, and to deposite the fertilizer as two continuous bands on opposite sides of the seed row, as shown in Figure 12.

It will be noted that the fertilizer is imbedded in the soil in the form of accumulated or concentrated deposits $d$. Preferably these deposits are below the planted depth of the seed, although the fertilizer may, of course, be deposited at any desired level above or below the seed, as desired by giving the lateral furrow openers the proper depth adjustment. By imbedding the deposits fertilizer $d$ below the seed the roots sprouting therefrom reach the fertilizer deposits and absorb the nutritive properties thereof. In the construction shown in Figures 6 and 7 the lateral furrow openers 59' can be shifted towards and away from the seed furrow opener for securing a different spacing of the fertilizer deposits with respect to the seed, such adjustment of the lateral furrow openers being accomplished by loosening the U shaped clamping bolts 82 and shifting the supporting arms 79 laterally along the frame bar 18.

What I claim as my invention and desire to secure by Letters Patent is:

1. In a combined planter and fertilizer distributor, the combination of an intermediate furrow opener for opening a seed furrow, said intermediate furrow opener having an upwardly extending shank, seed feeding means discharging into said furrow, laterally disposed furrow openers mounted on said shank for opening secondary furrow on each side of said seed furrow, fertilizer feeding means discharging into said secondary furrows, and coacting valve means cooperating with each of said feeding means for controlling the feed of seed and fertilizer into said furrows.

2. In a combined planter and fertilizer distributor, the combination of an intermediate furrow opener for opening a seed furrow, said intermediate furrow opener having an upwardly extending shank, seed feeding means discharging into said furrow, laterally disposed furrow openers adjustably mounted on said shank for opening secondary furrows on each side of said seed furrow, fertilizer feeding means discharging into said secondary furrows, and check-row mechanism cooperating with each of said feeding means for controlling the feed of seed and fertilizer into said furrows.

3. In an implement of the class described, the combination of a seed furrow opener having a shank portion extending upwardly therefrom, means for planting seed in the furrow opened thereby, a secondary furrow opener disposed substantially in the same transverse plane as said seed furrow opener for opening a fertilizer furrow spaced laterally from said seed furrow, means for depositing fertilizer in said fertilizer furrow, and means adjustably supporting said secondary furrow opener on said shank portion of the seed furrow opener for different depth adjustments.

4. In an implement of the class described, the combination of a runner adapted to open a seed furrow, said runner having an upwardly extending shank, means for planting seed in said seed furrow, secondary furrow openers adapted to open secondary furrows spaced laterally from said seed furrow, means for depositing fertilizer in each of said secondary furrows, and means adjustably supporting said secondary furrow openers on said upwardly extending shank for permitting different depth adjustments thereof.

5. In an implement of the class described, the combination of a seed furrow opener, means for planting seed in the furrow opened thereby, two furrow openings discs adjustably mounted on said seed furrow opener and adapted to open secondary furrows on each side of the seed furrow, and means for depositing fertilizer in each of said secondary furrows.

6. In an implement of the class described, the combination of a runner for opening a seed furrow, a runner shank supporting said runner, means for planting seed in said seed furrow, a pair of furrow opening discs disposed laterally of said runner and adapted to open secondary furrows spaced laterally from said seed furrow, means for detachably securing said discs to said runner shank, and means for depositing fertilizer in said secondary furrows.

7. In an implement of the class described, the combination of an intermediate furrow opener adapted to open the seed furrow, means for planting the seed in said furrow, seed valve mechanism adapted to control planting of the seed, lateral furrow openers adapted to open secondary furrows on each side of said seed furrow, a fertilizer hopper, conduit means extending down from said hopper and adapted to deposit fertilizer in each of said secondary furrows at points approximately in the same transverse plane with the seed in said seed furrow, relatively stationary closure members adapted to close the discharge ends of said conduit means, and means actuated by said seed valve mechanism for moving the discharge ends of said conduit means out of registry with said closure members.

8. In a combined planter and fertilizer distributor, the combination of a seed furrow opener, means for planting seed in the furrow opened thereby, a disc for opening a secondary furrow to one side of the seed furrow, a fertilizer hopper, a conduit for discharging the fertilizer therefrom to said secondary furrow, valve means for controlling the discharge of fertilizer from said conduit, and a bracket member on which said disc is journaled and said valve means is supported, said bracket being mounted on said seed furrow opener.

9. In a combined planter and fertilizer distributor, the combination of a runner for opening a seed furrow, a runner shank supporting said runner, means for planting seed in said seed furrow, a transversely extending bracket adjustably mounted on said runner shank, a pair of discs rotatably supported on said bracket for opening secondary furrows on opposite sides of the seed furrow, a fertilizer hopper, a branched conduit leading therefrom for discharging fertilizer directly in rear of said discs into said secondary furrows, stationary closure members carried by said bracket and adapted to close the branched ends of said conduit, and means for moving the latter ends of said conduit out of operative registry with said closure members.

10. In an implement of the class described, the combination of a seed furrow opener having a shank portion extending upwardly therefrom, means for planting seed in the furrow opened thereby, a secondary furrow opener for opening a fertilizer furrow spaced laterally from said seed furrow, means for depositing fertilizer in said fertilizer furrow, and means adjustably supporting said secondary furrow opener on said shank portion of the seed furrow opener, said means comprising a mounting block secured to said secondary furrow opener, and a U-bolt connected to said mounting block and embracing the shank portion of said seed furrow opener.

11. In an implement of the class described, the combination of a runner adapted to open a seed furrow, said runner having an upwardly extending shank, means for planting seed in said seed furrow, secondary furrow openers adapted to open secondary furrows spaced laterally from said seed furrow, means for depositing fertilizer in each of said secondary furrows, and means adjustably supporting said secondary furrow openers on said upwardly extending shank for permitting different depth adjustments thereof, said means comprising a transversely extending yoke secured to said secondary furrow openers, and a U-shaped bolt connected with said yoke and embracing said upwardly extending shank.

CHARLES H. WHITE.